United States Patent
Hong

(10) Patent No.: US 11,618,812 B2
(45) Date of Patent: Apr. 4, 2023

(54) BIO-BASED UV-CURABLE 3D PRINTED RESIN AND PREPARATION METHOD THEREOF

(71) Applicant: SHENZHEN ZHINENGPAI TECHNOLOGY CO., LTD, Shenzhen (CN)

(72) Inventor: Yingsheng Hong, Shenzhen (CN)

(73) Assignee: SHENZHEN ZHINENGPAI TECHNOLOGY CO., LTD, Shenzhen (CN)

(*) Notice: Subject to any disclaimer, the term of this patent is extended or adjusted under 35 U.S.C. 154(b) by 421 days.

(21) Appl. No.: 16/892,434

(22) Filed: Jun. 4, 2020

(65) Prior Publication Data
US 2021/0332219 A1    Oct. 28, 2021

(30) Foreign Application Priority Data
Apr. 28, 2020    (CN) .......................... 2020103468771

(51) Int. Cl.
C08L 3/02       (2006.01)
B29C 64/314    (2017.01)
C08J 3/00       (2006.01)
C08J 3/205     (2006.01)
C08K 3/22       (2006.01)
C08K 5/092     (2006.01)
C08K 5/1539    (2006.01)
B33Y 10/00     (2015.01)
B33Y 40/10     (2020.01)
B33Y 70/10     (2020.01)

(52) U.S. Cl.
CPC .............. *C08L 3/02* (2013.01); *B29C 64/314* (2017.08); *C08J 3/005* (2013.01); *C08J 3/205* (2013.01); *C08K 3/22* (2013.01); *C08K 5/092* (2013.01); *C08K 5/1539* (2013.01); *B33Y 10/00* (2014.12); *B33Y 40/10* (2020.01); *B33Y 70/10* (2020.01); *C08J 2303/02* (2013.01); *C08K 2003/2206* (2013.01); *C08L 2201/06* (2013.01)

(58) Field of Classification Search
None
See application file for complete search history.

(56) References Cited

FOREIGN PATENT DOCUMENTS

CN    108587100    *    9/2018

OTHER PUBLICATIONS

Machine translation of Xiao et al. (CN 108587100) (Year: 2018).*

* cited by examiner

*Primary Examiner* — Robert T Butcher
(74) *Attorney, Agent, or Firm* — McClure, Qualey & Rodack, LLP

(57) ABSTRACT

A bio-based UV-curable 3D printed resin includes the following components by weight percentage: 19-78% of biodegradable starch resin polymer, 1-9% of radical initiator, 0.2-4% of adjuvant, 13-62% of reactive diluent and 2-8% hydroxyethyl starch. The preparation method thereof comprises the following steps of: mixing the above components by component proportion, ultrasonically washing the mixture for 10-20 min by an ultrasonic cleaner under a water temperature of 50° C., and then mixing the same in a homogenizer homogeneously to obtain the bio-based UV-curable 3D printed resin. The renewable resources are adopted and the environmental pollution and energy consumption are reduced, which is of bio-safety. Moreover, the hydroxyethyl starch has a high molecular compound generated by hydroxyethylation of glucose ring of amylose, resulting in various benefits. The 3D printed resin obtained has excellent performance and low skin irritation value.

2 Claims, No Drawings

BIO-BASED UV-CURABLE 3D PRINTED RESIN AND PREPARATION METHOD THEREOF

TECHNICAL FIELD

The present invention relates to the field of 3D printing materials, in particular to a bio-based UV-curable 3D printed resin and preparation method thereof.

BACKGROUND TECHNOLOGY

Although the 3D printing technology is booming, most of the UV-curable resins among the printing materials are non-recyclable materials, which are easy to cause environmental pollution and lack of biological safety. Besides, most of them have the disadvantages of poor performance and easy to irritate the skin.

As a result, the existing technology is flawed and needs to be improved.

SUMMARY OF INVENTION

The technical problem to be solved by the present invention is to offer a bio-based UV-curable 3D printed resin and preparation method thereof, wherein the resin obtained in present invention is biodegradable and has less environmental pollution, good performance, and low skin irritation value.

The technical schemes adopted in present invention are as follows: a bio-based UV-curable 3D printed resin comprises the following components by weight percentage: 19-78% of biodegradable starch resin polymer, 1-9% of radical initiator, 0.2-4% of adjuvant and 13-62% of reactive diluent.

The bio-based UV-curable 3D printed resin obtained by the technical schemes above, comprises the biodegradable starch resin polymer which is generated by mixed reaction of the following components by mass ratio: 320 g of biodegradable starch resin, 189 g of polyethylene glycol, 0.2 g of calcium hydroxide, 180 g of phthalic anhydride and 65 g of maleic acid.

The bio-based UV-curable 3D printed resin obtained by the technical schemes above, comprises the radical initiator which is any one or several combinations of photoinitiator 1173, photoinitiator 184, photoinitiator 907, photoinitiator TPO, photoinitiator 651, photoinitiator 819, photoinitiator 369 and photoinitiator DETX.

The bio-based UV-curable 3D printed resin obtained by the technical schemes above, comprises the adjuvant which includes a leveling agent and a defoamer.

The bio-based UV-curable 3D printed resin obtained by the technical schemes above, comprises the leveling agent which is any one of polydimethylsiloxane, polyphenylmethylsiloxane and organosilicon modified polysiloxane.

The bio-based UV-curable 3D printed resin obtained by the technical schemes above, comprises the leveling agent which is any one or several combinations of BYK-UV333, MOK-2120 and B-0520.

The bio-based UV-curable 3D printed resin obtained by the technical schemes above, the reactive diluent is any one or several combinations of isobornyl acrylate, tetrahydrofurfuryl acrylate, isodecyl acrylate, tridecyl acrylate, polyethylene glycol (400) diacrylate [PEG(400)DA], cyclic trimethylopropane methylal acrylate, 2-phenoxyethyl acrylate, cyclohexyl methacrylate and propoxylated (2) neopentyl glycol diacrylate.

A method for preparing the bio-based UV-curable 3D printed resin above comprises the following steps of:

(1) mixing the biodegradable starch resin, polyethylene glycol and calcium hydroxide by mass ratio to obtain a mixture;

(2) heating the mixture for 4 hours at 260° C., and then cooling to 120° C.;

(3) adding phthalic anhydride and maleic acid, and conducting polycondensation reaction at 260° C., so as to obtain a biodegradable starch resin polymer;

(4) mixing the biodegradable starch resin polymer, the radical initiator, the adjuvant and the reactive diluent by component proportion, ultrasonically washing the mixture for 10-20 mins by an ultrasonic cleaner under a water temperature of 40° C.-50° C., and then mixing the same evenly in a homogenizer homogeneously to obtain the bio-based UV-curable 3D printed resin.

Using the above technical schemes, the present invention has the following beneficial effects:

1. The renewable resources are adopted and the environmental pollution and energy consumption are reduced, which is of bio-safety.
2. The hydroxyethyl starch is added so that a high molecular compound is generated by hydroxyethylation of glucose ring of amylose, thereby increasing the polymerization speed, improving the conversion rate of resin molding, and reducing ratio of photoinitiator and monomer chemicals.
3. The hydroxyethyl starch and the biodegradable starch resin are added so that the 3D printed product obtained could be biodegradable. And when used up and entered the natural environment, it could be decomposed by itself under the action of microorganisms, light and water, etc., and eventually be decomposed into carbon dioxide and oxygen, which hardly cause pollution to the environment.
4. And the 3D printed resin obtained in present invention has excellent performance and low skin irritation value.

SPECIFIC EMBODIMENTS

The present invention provides a bio-based UV-curable 3D printed resin and preparation thereof, and the bio-based UV-curable 3D printed resin comprises the following components by weight percentage: 19-78% of biodegradable starch resin polymer, 1-9% of radical initiator, 0.2-4% of adjuvant and 13-62% of reactive diluent.

The biodegradable starch resin polymer is generated by mixed reaction of the following components by mass ratio: 320 g of biodegradable starch resin, 189 g of polyethylene glycol, 0.2 g of calcium hydroxide, 180 g of phthalic anhydride and 65 g of maleic acid.

The radical initiator is any one or several combinations of photoinitiator 1173, photoinitiator 184, photoinitiator 907, photoinitiator TPO, photoinitiator 651, photoinitiator 819, photoinitiator 369 and photoinitiator DETX.

The adjuvant includes a leveling agent and a defoamer.

The leveling agent is any one of polydimethylsiloxane, polyphenylmethylsiloxane and organosilicon modified polysiloxane.

The leveling agent is any one or several combinations of BYK-UV333, MOK-2120 and B-0520.

The reactive diluent is any one or several combinations of isobornyl acrylate, tetrahydrofurfuryl acrylate, isodecyl acrylate, tridecyl acrylate, polyethylene glycol (400) diacrylate [PEG(400)DA], cyclic trimethylopropane methylal acrylate, 2-phenoxyethyl acrylate, cyclohexyl methacrylate and propoxylated (2) neopentyl glycol diacrylate.

The hydroxyethyl starch is an existing product produced by HUBEI HENGJINGRUI CHEMICAL CO., LTD or by SHANGHAI KANGLANG BIOTECHNOLOGY CO., LTD.

The method for preparing the above bio-based UV-curable 3D printed resin comprises the following steps of:

(1) mixing the biodegradable starch resin, polyethylene glycol and calcium hydroxide by mass ratio to obtain a mixture, wherein the biodegradable starch resin of 320 g and polyethylene glycol of 189 g are applied for a transesterification reaction, and the calcium hydroxide of 0.2 g performs a catalyst.

(2) heating the mixture for 4 hours at 260° C., and then cooling to 120° C.;

(3) adding the phthalic anhydride of 180 g and the maleic acid of 65 g into the mixture, and conducting polycondensation reaction at 260° C. till the condition when an acid value is reduced to below 10% of an initial value, so as to obtain a biodegradable starch resin polymer with the acid value of 10.9 mg KOH/g;

(4) mixing the biodegradable starch resin polymer, the radical initiator, the adjuvant and the reactive diluent by component proportion, ultrasonically washing the mixture for 10-20 mins by an ultrasonic cleaner under a water temperature of 40° C.-50° C., and then mixing the same evenly in a homogenizer homogeneously to obtain the bio-based UV-curable 3D printed resin.

According to the above technical schemes, the comparisons will be conducted among resins obtained in Embodiments 1-3 and two conventional 3D printed resins.

Embodiment 1

Components:
39 g of biodegradable starch resin polymer,
47.5 g of reactive diluent NPG(PO)$_2$DA,
5 g of photoinitiator TPO,
2.5 g of BYK-333,
5 g of hydroxyethyl starch
and 1 g of BYK-UV3510

The preparation method in present embodiment comprises the following steps of: mixing components above to get a mixture, washing the mixture ultrasonically for 20 mins by an ultrasonic cleaner under a water temperature of 50° C. and then mixing the same evenly in a homogenizer homogeneously to obtain a bio-based UV-curable 3D printed resin.

Embodiment 2

Components:
48.5 g of biodegradable starch resin polymer,
39 g of reactive diluent PEG(400)DA,
2 g of photoinitiator TPO,
2 g of photoinitiator 819,
2 g of B-0520,
5.5 g of hydroxyethyl starch,
and 1 g of MOK-2120.

The preparation method in present embodiment comprises the following steps of: mixing components above to get a mixture, washing the mixture ultrasonically for 20 mins by an ultrasonic cleaner under a water temperature of 50° C., and then mixing the same evenly in a homogenizer homogeneously to obtain a bio-based UV-curable 3D printed resin.

Embodiment 3

Components:
48.2 g of biodegradable starch resin polymer,
42 g of reactive diluent IBOA,
2 g of photoinitiator TPO,
2 g of photoinitiator 369,
1.8 g of BYK-333,
6 g of hydroxyethyl starch,
and 1 g of BYK-UV3510.

The preparation method in present embodiment comprises the following steps of: mixing components above to get a mixture, washing the mixture ultrasonically for 10 mins by an ultrasonic cleaner under a water temperature of 40° C., and then mixing the same evenly in a homogenizer homogeneously to obtain a new generation of environment-friendly and human-friendly vegetable oil-based UV-curable 3D printed resin.

Comparative Embodiment 1

Ordinary polyester epoxy acrylic resin UV-curable 3D printed resin sample is used as the comparative embodiment 1.

Comparative Embodiment 2

Ordinary polyether urethane acrylate UV-curable 3D printed resin sample is used as the comparative embodiment 2.

The products in Embodiments 1-3 and comparative embodiments 1-2 are all tested for performance. The test results are shown in Table 1.

TABLE 1

| Item | Embodiment 1 | Embodiment 2 | Embodiment 3 | Comparative Embodiment 1 | Comparative Embodiment 2 |
|---|---|---|---|---|---|
| Percentage of Breaking Elongation (%) | 2.8 | 2.6 | 2.6 | 1.2 | 1.8 |
| UV-curable activity | Excellent | Excellent | Good | Excellent | Excellent |
| Shrinkage of Cured Resin (%) | 2.8 | 2.6 | 2.6 | 2.9 | 3.0 |
| Viscosity (cps/25° C.) | 3.8 | 3.8 | 3.6 | 3.8 | 3.9 |
| Impact Strength of Notch (KJ/m$^2$) | 29.9 | 29.6 | 28.8 | 28.9 | 28.5 |

TABLE 1-continued

| Item | Embodiment 1 | Embodiment 2 | Embodiment 3 | Comparative Embodiment 1 | Comparative Embodiment 2 |
|---|---|---|---|---|---|
| Tensile Strength (MPa) | 24.9 | 25.9 | 23.6 | 25.6 | 24.9 |
| GB/T20197-2006 | Standards compliant | Standards compliant | Standards compliant | Non-compliant | Non-compliant |
| Skin Irritation Values | 0.6 | 0.5 | 0.5 | 5 | 5 |

Referred to the above comparisons, it could be found that the performance of the printed resins in Embodiments 1-3 is better than that of the two conventional printing resins in Comparative Embodiments 1-2, and the skin stimulation values of the printed resin in Embodiments 1-3 is far less than those of the two conventional printed resins in Comparative Embodiments 1-2.

Using the above technical schemes, the present invention has the following beneficial effects:

1. The renewable resources are adopted and the environmental pollution and energy consumption are reduced, which is of bio-safety.
2. The hydroxyethyl starch is added so that a high molecular compound is generated by hydroxyethylation of glucose ring of amylose, thereby increasing the polymerization speed, improving the conversion rate of resin molding, and reducing ratio of photoinitiator and monomer chemicals.
3. The hydroxyethyl starch and the biodegradable starch resin are added so that the 3D printed product could be biodegradable. And when used up and entered the natural environment, it could be decomposed by itself under the action of microorganisms, light and water, etc., and eventually be decomposed into carbon dioxide and oxygen, which hardly cause pollution to the environment.
4. And the 3D printed resin obtained in present invention has excellent performance and low skin irritation value.

The above are only better embodiments of the present invention and are not used to limit the present invention. Any modification, equivalent replacement and improvement made within the spirit and principles of the invention shall be included in the scope of protection of the invention.

The invention claimed is:

1. A bio-based UV-curable 3D printed resin, comprising the following components by weight percentage: 19-78% of biodegradable starch resin polymer, 1-9% of radical initiator, 0.2-4% of adjuvant and 13-62% of reactive diluent, wherein the biodegradable starch resin polymer is generated by mixed reaction of the following components by mass ratio: 320 g of biodegradable starch resin, 189 g of polyethylene glycol, 0.2 g of calcium hydroxide, 180 g of phthalic anhydride and 65 g of maleic acid.

2. A method for preparing the bio-based UV-curable 3D printed resin according to claim 1, wherein the preparation method comprises the following steps of:
   (1) mixing the biodegradable starch resin, polyethylene glycol and calcium hydroxide to obtain a mixture;
   (2) heating the mixture for 4 hours at 260° C., and then cooling to 120° C.;
   (3) adding phthalic anhydride and maleic acid, and conducting polycondensation reaction at 260° C. till the condition when an acid value is reduced to below 10% of an initial value, so as to obtain a biodegradable starch resin polymer with an acid value of 10.9 mg KOH/g;
   (4) mixing the biodegradable starch resin polymer, the radical initiator, the adjuvant and the reactive diluent, ultrasonically washing the mixture for 10-20 mins by an ultrasonic cleaner under a water temperature of 40° C.-50° C., and then mixing the same evenly in a homogenizer homogeneously to obtain the bio-based UV-curable 3D printed resin.

* * * * *